United States Patent Office 3,629,193
Patented Dec. 21, 1971

3,629,193
ULTRAVIOLET-ABSORPTION AGENTS FOR POLYCARBONATES
Wolfgang Metzner, Krefeld, and Gunter Peilstocker, Krefeld-Bockum, Germany, assignors to Farbenfabriken Bayer Aktiengesellschaft, Leverkusen, Germany
No Drawing. Filed Feb. 13, 1970, Ser. No. 11,313
Claims priority, application Germany, Feb. 25, 1969, P 19 09 380.4
Int. Cl. C08g 51/58
U.S. Cl. 260—45.85
2 Claims

ABSTRACT OF THE DISCLOSURE

Polycarbonate materials are protected against the effect of ultraviolet rays by incorporation of materials of the formula

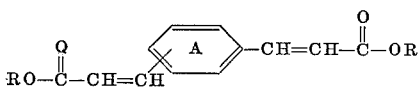

in which

R stands for an optionally substituted alkyl, cycloalkyl, aralkyl or aryl radical, and the ring A may contain further substituents.

---

The subject-matter of the present invention is the use of compounds of the general formula

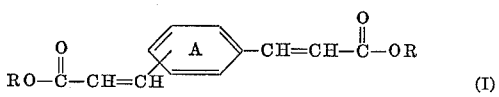   (I)

in which R stands for an optionally substituted alkyl, cycloalkyl, aralkyl or aryl radical, and the ring A may contain further substituents, for protecting organic materials from the effect of U.V. rays.

The radical R may be identical or different. Suitable radicals R are, for example, methyl, ethyl, propyl, dodecyl, cyclohexyl, benzyl, phenyl radicals and phenyl radicals which are substituted by halogen, alkyl and alkoxy radicals.

Suitable substituents for A are, for example, halogen or alkyl.

Preferred compounds within the scope of the Formula I are those of the formula

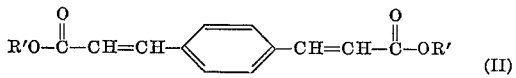   (II)

or of the formula

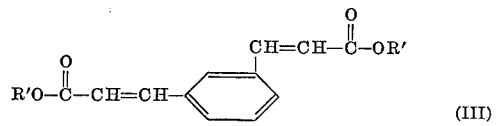   (III)

in which R' stands for an alkyl radical with 1–20 carbon atoms which is not further substituted, or for a cyclohexyl, benzyl or phenyl radical.

Examples are those compounds of the Formulae II and III in which R' stands for methyl, ethyl, n-dodecyl, cyclohexyl, benzyl and phenyl.

The compounds to be used according to the invention, some of which are known, can be obtained, for example, by condensing dialdehydes of the formula

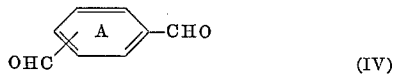   (IV)

in which the ring A may contain further substituents, with malonic acid semiesters of the formula $$HO\overset{O}{\underset{\|}{C}}-CH_2-\overset{O}{\underset{\|}{C}}OR \qquad (V)$$

in which R has the same meaning as above.

Suitable aldehydes (IV) are, for example, terephthalaldehyde, isophthalaldehyde, 2 - chloro - terephthalaldehyde, 2 - fluoro - terephthalaldehyde, 2 - methyl-terephthalaldehyde, 2,3 - dichloro - terephthalaldehyde, 2,5-dichloro - terephthalaldehyde, 2,5 - dimethyl - terephthalaldehyde, tetramethyl - terephthalaldehyde, 2,5 - dimethoxy - terephthalaldehyde, 4 - methoxy - isophthalaldehyde, 5 - methyl - isophthalaldehyde, tetramethyl-isophthalaldehyde.

Suitable malonic acid esters (V) are, for example, malonic acid monomethyl ester, malonic acid monoethyl ester, malonic acid monopropyl ester, malonic acid monoisopropyl ester, malonic acid monobutyl ester, malonic acid mono-sec.-butyl ester, malonic acid mono-tert.-butyl ester, malonic acid monopentyl ester, malonic acid monohexyl ester, malonic acid monooctyl ester, malonic acid monononyl ester, malonic acid monodecyl ester, malonic acid monododecyl ester, malonic acid monooctadecyl ester, malonic acid monobenzyl ester, malonic acid monophenyl ester, malonic acid monocyclohexyl ester.

The compounds to be used according to the invention are particularly suitable as U.V.-absorbers for polymers such as polystyrenes, polyacrylonitriles, polyacrylates and their copolymers, polydienes, e.g. polybutadiene, polyvinyl chloride, polyvinylidene chloride, polypropylene, polyethylene; polyesters, e.g. polyethylene terephthalate, polycarbonate; polyamide, e.g. polycaprolactam and polyurethanes; polyethers, e.g. polysulphone, they are especially suitable for polymers which are processed at higher temperatures, e.g. above 150° C., such as polycarbonates. The compounds to be used according to the invention are added to the polymers in amounts of about 5%, preferably in amounts of 0.1–2.0%.

Incorporation of the compounds according to the invention can be carried out according to the processes known from the literature, for example, by mixing them with the polymers before these are further processed at an elevated temperature, by addition to the melt of the polymers, or by adding them to suspended or dissolved polymers during the processing thereof. They can also be added already to the starting materials for the production of the polymers, and they do not lose their absorption capacity, even in the presence of other conventional light and heat stabilisers, oxidising and reducing agents, and the like.

It is true that methylene-malonic acid derivatives have already been proposed as U.V.-absorption agents; however, the substances according to the invention are superior to the corresponding compounds described in German patent specification No. 1,087,902 or in Belgian patent specification No. 684,526 by their high molar extinction coefficients and the absorption of longer waves while, at the same time, being colourless. The claimed compounds also compare favourably with the known U.V.-absorbers containing hydroxyl groups, such as benzophenone and benzotriazole derivatives, on account of their low sensitivity to alkali. Due to these properties in combination with a high thermal and photochemical stability and high resistance to sublimation, the compounds (I) are especially suitable as U.V.-absorbers, for organic materials which are stable to high temperatures. For example, they can be incorporated with polycarbonate at 300–350° C., without the polycondensate changing its colour; it is therefore possible to dispense with the use of heat stabilisers which is recommended in French patent specification No.

1,487,593, in order to increase the thermal stability of the U.V.-absorbers.

EXAMPLE 1

Determination of the thermal stability in polycarbonate in comparison with the known U.V.-absorbers:

100 kg. of polycarbonate (poly-[4,4'-dihydroxydiphenyl-2,2-propane]-carbonate) with a relative viscosity of 1.30, measured on a 0.5% solution in methylene chloride at +25° C., were divided into 11 equal portions. Then of the 11 portions were admixed by conventional methods with 0.5% by weight of one of the compounds 2–11 of the following Table 1 (the compounds 2–6 are conventional U.V.-absorbers), the mixture was homogenized by means of a two-shaft extrude at temperatures of 300° C. and extruded as a wire of about 2.5 mm. diameter. The wire was then cut into small pieces of about 3 mm. length. The granulates prepared in this way were processed by means of a commercial injection moulding machine at temperatures of 320° C., measured as the temperature of the melt, to produce test pieces of the dimensions 60 x 50 x 4 mm. The 11th portion served as control and contained no U.V.-absorber. The measured percentage values for the light transmission of the test pieces so obtained at a wave length of 420 m$\mu$ (standard light C according to DIN 5033) are assembled in Table 1:

TABLE 1.—LIGHT TRANSMISSION VALUES OF POLYCARBONATE SAMPLES (THICKNESS OF TEST PIECES 4 MM., WAVELENGTH 420 M$\mu$)

| Sample No. | U.V.-absorber | Light transmission (percent) |
|---|---|---|
| 1 | Blank test without additive | 84 |
| 2 | 2-(2'-hydroxy-5'-methylphenyl)-benzotriazole | 75 |
| 3 | 2-(2'-hydroxy-3',5'-di-amyl-phenyl)-benzotriazole | 69 |
| 4 | 2,2'-dihydroxy-4-methoxy-benzophenone | 20 |
| 5 | 2,2'-dihydroxy-4-n-octoxy-benzophenone | 40 |
| 6 | α-Cyano-β-methyl-p-methoxy-cinnamic acid methyl ester | 12 |
| 7 | p-Phenylene-bis-acrylic acid ethyl ester | 78 |
| 8 | p-Phenylene-bis-acrylic acid-n-dodecyl ester | 80 |
| 9 | p-Phenylene-bis-acrylic acid phenyl ester | 79 |
| 10 | m-Phenylene-bis-acrylic acid ethyl ester | 77 |
| 11 | m-Phenylene-bis-acrylic acid benzyl ester | 81 |

As can be seen from the Table 1, the test pieces produced from the samples 7–11, which contain compounds to be used according to the invention, have the highest values of light transmission at a wave length of 420 m$\mu$, that is to say that these products have an excellent thermal stability at the high processing temperatures of 320° C. and permit of the production of U.V.-stabilized colourless moulding materials or moulded parts of polycarbonate.

The superiority of the compounds to be used according to the invention is also apparent from the weathering and annealing tests. For this purpose, the samples 1, 2, 3, 7 and 10 listed in Table 1 were weathered or annealed under comparable conditions for 1000 hours. A certain yellowing of the samples occurred. As a quantitative measure, the yellowing factors of the test pieces were determined according to the following equation:

$$YF = \frac{T_{610m\mu} - T_{450m\mu} \times 100}{T_{560m\mu}}$$

(T=light transmission of test pieces). Table 2 shows that the yellowing factor of the samples containing two of the compounds to be used according to the invention [p- and m-phenylene-bis-(acrylic acid ethyl ester)] after weathering and annealing is lower than that of the benzotriazole derivatives 2 - (2' - hydroxy-5'-methyl-phenyl)-benzotriazole and 2 - [2'-hydroxy-3',5'-di-amyl-phenyl)-benzotriazole.

TABLE 2.—WEATHERING AND ANNEALING OF TEST PIECES OF POLYCARBONATE

| | | | Yellowing factors (YF) | | |
|---|---|---|---|---|---|
| Sample No. | U.V.-absorber | Addition (percent b.w.) | Before | After 1,000 hrs. weather-o-meter | After 21 days at 140° C./air |
| 1 | | | 4.5 | 12.0 | 5.0 |
| 2 | 2-(2'-hydroxy-5-methyl-phenyl)-benzotriazole. | 0.5 | 8.1 | 9.3 | 9.7 |
| 3 | 2-(2'-hydroxy-3',5'-diamyl-phenyl-benzotriazole. | 0.5 | 8.2 | 10.0 | 11.0 |
| 4 | p-Phenylene-bis-(acrylic acid ethyl ester). | 0.5 | 7.5 | 7.9 | 7.5 |
| 5 | m-Phenylene-bis-(acrylic acid ethyl ester). | 0.5 | 7.5 | 8.7 | 8.0 |

We claim:
1. Polycarbonate materials which are protected against the effect of ultraviolet rays by reason of incorporation therein of compounds of the formula

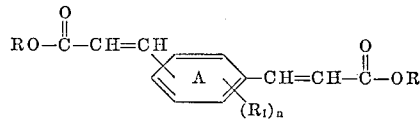

in which

R stands for a member selected from the group consisting of alkyl, haloalkyl, alkoxyalkyl, cycloalkyl, aryl, aralkyl and the corresponding halo, alkoxy and alkyl substituted derivatives of the cycloalkyl, aryl and aralkyl radicals; and wherein $R_1$ stands for a substituent selected from the group consisting of halogen, alkyl and methoxy and $n$ is an integer from 0 to 4.

2. Polycarbonate materials of claim 1 wherein the incorporated compounds has the formula

wherein

R' is selected from the group consisting of alkyl with 1–20 carbon atoms, cyclohexyl, benzyl and phenyl.

References Cited

UNITED STATES PATENTS

| 2,995,540 | 8/1961 | Duennenberger et al. | 260—45.8 |
| 3,004,896 | 10/1961 | Heller et al. | 260—45.8 |
| 3,341,464 | 9/1967 | Susi et al. | 252—300 |

OTHER REFERENCES

Plastics & Polymers—periodical published June 1968, vol. 36, No. 123, pp. 195–203, Article by A. King.

DONALD E. CZAJA, Primary Examiner

V. P. HOKE, Assistant Examiner

U.S. Cl. X.R.

260—45.8 N, 475 SC